Feb. 26, 1935.    A. B. MORRELL    1,992,578
AUTOMOBILE LICENSE PLATE
Filed Oct. 11, 1934
Fig. 1.
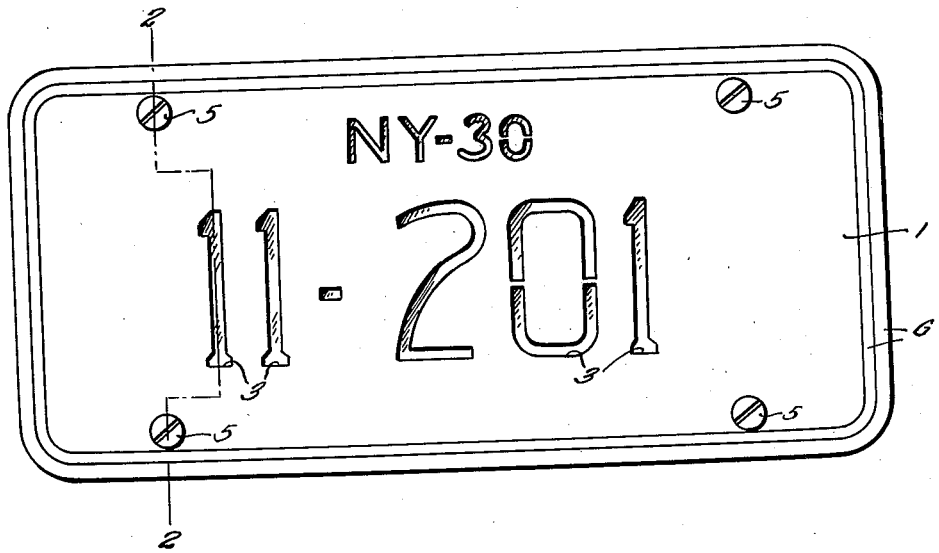
Fig. 3.
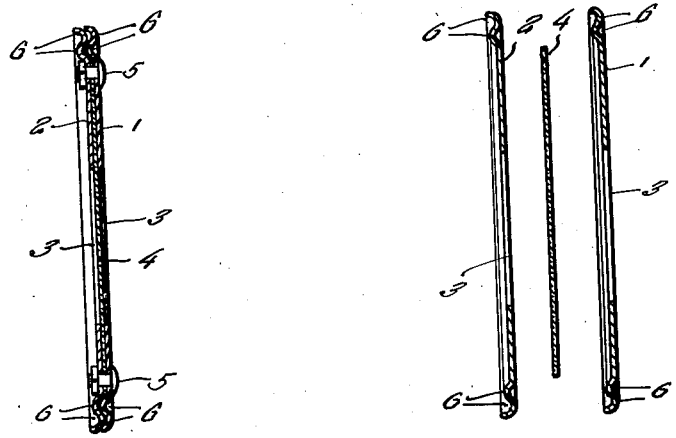
Fig. 2.
Inventor
Alfred B. Morrell
By *Clarence A. O'Brien*
Attorney Patented Feb. 26, 1935

1,992,578

UNITED STATES PATENT OFFICE 1,992,578

AUTOMOBILE LICENSE PLATE

Alfred B. Morrell, Bayside, N. Y.

Application October 11, 1934, Serial No. 747,939

2 Claims. (Cl. 40—125)

The present invention relates to new and useful improvements in automobile license plates and has for its primary object to provide, in a manner as hereinafter set forth, a device of this character embodying a novel construction, combination and arrangement of parts through the medium of which the numbers thereon may be readily observed during the day or night.

Other objects of the invention are to provide an automobile license plate which will be comparatively simple in construction, strong, durable, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in front elevation of an automobile license plate constructed in accordance with the present invention.

Figure 2 is a view in vertical section through the license plate, taken substantially on the line 2—2 of Figure 1.

Figure 3 is a vertical sectional view through the invention showing the parts separated.

Referring now to the drawing in detail, it will be seen that the embodiment of the invention which has been illustrated comprises comparatively thin front and rear metallic plates 1 and 2, respectively. The plates 1 and 2 have formed therein registering cut-out numerals 3.

Mounted between the plates 1 and 2 is a distinctively colored sheet of translucent material 4, the edges of which are spaced inwardly from the edges of said plates 1 and 2, as illustrated to advantage in Figures 2 and 3 of the drawing. The plates 1 and 2 and the translucent sheet 4 are firmly secured together in assembled relationship through the medium of nut equipped bolts 5 which, as shown in Figure 2, pass through said sheet 4 as well as through the plates 1 and 2.

The marginal portions of the plates 1 and 2 which extend beyond the edges of the translucent sheet 4 have formed therein interlocking corrugations 6. In addition to strengthening the comparatively thin sheets 1 and 2, the interlocking corrugations 6 secure said sheets against relative lateral movement when assembling the device and provide a substantially leak-proof joint or seal therebetween after said device is assembled.

In use, the distinctively colored sheet 4 makes the cut out numerals 3 easily distinguishable in daylight. The device is preferably placed in front of a suitable light which, at night, illuminates the cut out numerals 3 through the translucent distinctively colored sheet 4, thus permitting said numerals to be readily observed at night.

It is believed that the many advantages of an automobile license plate constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. An automobile license plate comprising front and rear metallic plates having registering cut out numerals therein, a distinctively colored sheet of translucent material mounted between the front and the rear plates, the edges of said translucent sheet being spaced inwardly from the edges of the plates, the marginal portions of the plates beyond the translucent sheet including interlocking corrugations, and nut equipped bolts extending through the plates and the translucent sheet for securing said plates and sheet together.

2. An automobile license plate comprising a pair of plates having registering cut out numerals therein, a translucent sheet mounted between the plates, interlocking corrugations on the marginal portions of the plates, and means for securing said plates together.

ALFRED B. MORRELL.